April 16, 1968

O. P. PRACHAR 3,377,803

JET ENGINE COOLING SYSTEM

Filed Aug. 10, 1960

INVENTOR.
Otakar P. Prachar
BY
Robert E. McCollum
ATTORNEY

April 16, 1968     O. P. PRACHAR     3,377,803
JET ENGINE COOLING SYSTEM Filed Aug. 10, 1960     5 Sheets-Sheet 5

INVENTOR.
Otakar P. Prachar
BY
Robert E. McCollum
ATTORNEY

United States Patent Office 3,377,803
Patented Apr. 16, 1968

3,377,803
JET ENGINE COOLING SYSTEM
Otakar P. Prachar, Birmingham, Mich., assignor to General Motors Corporation, Detroit, Mich., a corporation of Delaware
Filed Aug. 10, 1960, Ser. No. 48,732
6 Claims. (Cl. 60—261)

This invention relates to a fuel and cooling system for a gas turbine engine or the like, and more specifically to the cooling of the different hot sections of a turbomachine by the fuel that is burned in the combustion chambers to provide the gas propulsive force to the engine.

In the past, the design of a high speed air breathing type engine necessarily included additional cooling equipment because of the inability of the metals used to withstand the extremely high temperatures prevailing in the combustion and other hot sections of the engine. This, however, adds to the engine weight and often entails the use of bulky equipment projecting into the airstream thereby creating additional skin friction, etc., decreasing the efficiency of the engine.

This invention eliminates these disadvantages by providing an engine wherein the hot sections are cooled by a portion of the fuel that is burned in the combustion sections of the engine. More specifically, this invention contemplates cooling the main and afterburner section liners of a gas turbine engine by the absorption of the heat therefrom by a cryogenic fuel of high specific heat capacity, the fuel also cooling the radially inner portions of the compressor rotor, the turbine rotor stage, and the annular innerbody exhaust cone structure.

Therefore, it is an object of this invention to provide a fuel and cooling system for a gas turbine engine or the like utilizing a cryogenic fuel of high specific heat capacity for not only burning in the combustion sections but also for cooling the hot sections of an engine.

Other features, objects and advantages will become apparent upon reference to the succeeding detailed description of the invention and to the drawings illustrating the preferred embodiment thereof, wherein;

Figures 1, 2:
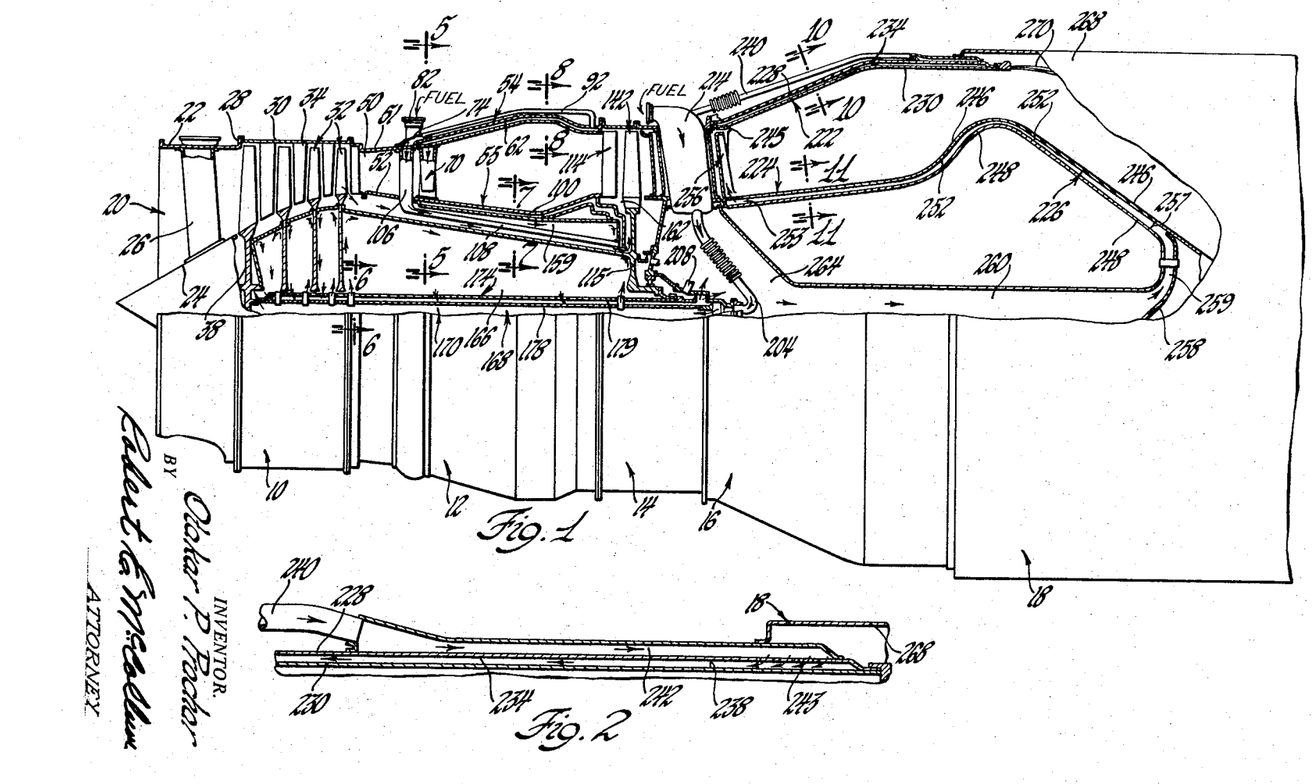
FIGURE 1 is a schematic side elevational view with parts broken away and in section of an engine embodying the invention.
FIGURES 2, 3 and 4 are enlarged views of details of FIGURE 1.

The drawings, particularly FIGURE 1, show an axial flow air breathing type engine having a compressor section 10, a main combustion section 12, a turbine section 14, an afterburner section 16, and an exhaust nozzle 18. In brief, the invention relates to the use of cryogenic or very low temperature ($-400°$ F., for example) fuels of high specific heat capacity for cooling the main and afterburner combustion section liners, the internal compressor and turbine rotor structure, and the inner exhaust cone structure. The heat of the parts is absorbed by the fuel which is subsequently injected into the combustion sections and burned.

With respect to the invention, the construction of the individual sections of the engine will first be described, with the overall operation of the engine and cooling systems being described later.

The engine includes at its forward or upstream end an inlet 20 defined by an outer annular engine casing portion 22 and an inner annular conical fairing 24 supported from the casing by a number (only one shown) of circumferentially spaced support struts 26. Casing 22 is connected at 28 to the annular engine casing portion 30 of the compressor section 10.

The compressor section comprises a four stage axial flow type compressor, each stage including a rotor wheel assembly 32 and a stator vane assembly 34. The rotor assemblies 32 each have a number of circumferentially spaced rotor blades 36 secured to a wheel 38, while the stator vane assemblies 34 each have a number of circumferentially spaced stator vanes 40 secured to and through the engine casing portion 30 by a supporting ring 42 hat-shaped in cross-section. The rotor blades of all the stages have annular outer shrouds 43 sealingly cooperating with stationary seal portions 44 secured to the casing 30. The stator vanes of the first three stages have annular inner shrouds 45 having stationary seal portions 46 cooperating with rotating seal portions 47 secured to stiffening drums 48. The drums are positioned between and secured to the rotor wheels to interconnect the four stages of the compressor rotor for simultaneous rotation. The rotor stages are rotatably supported within the engine casing by the mounting of the first stage rotor wheel 49 on the inner race of a bearing means (not shown), the outer race being secured to an extension of the supporting struts 26.

Extending downstream of the compressor section is a diverging air diffusion passage 50 defined by an outer engine casing portion 51 and an inner annular wall 52. Wall 52 is secured to an inner annular shroud 53 fixed to the circumferentially spaced guide vanes 40 secured to the engine casing in the manner shown.

The main combustion section comprises in general a single annular chamber bounded on the outside by the annular engine casing and on the inside by an annular wall. Each of the chamber walls is of a hollow double wall construction so that cryogenic fuel can be pumped through the hollow annulus from one end of the chamber to the other to cool the combustion chamber lining. The fuel is then injected into the combustion chamber proper and burned along with the main supply of fuel in the chamber.

Figure 4:
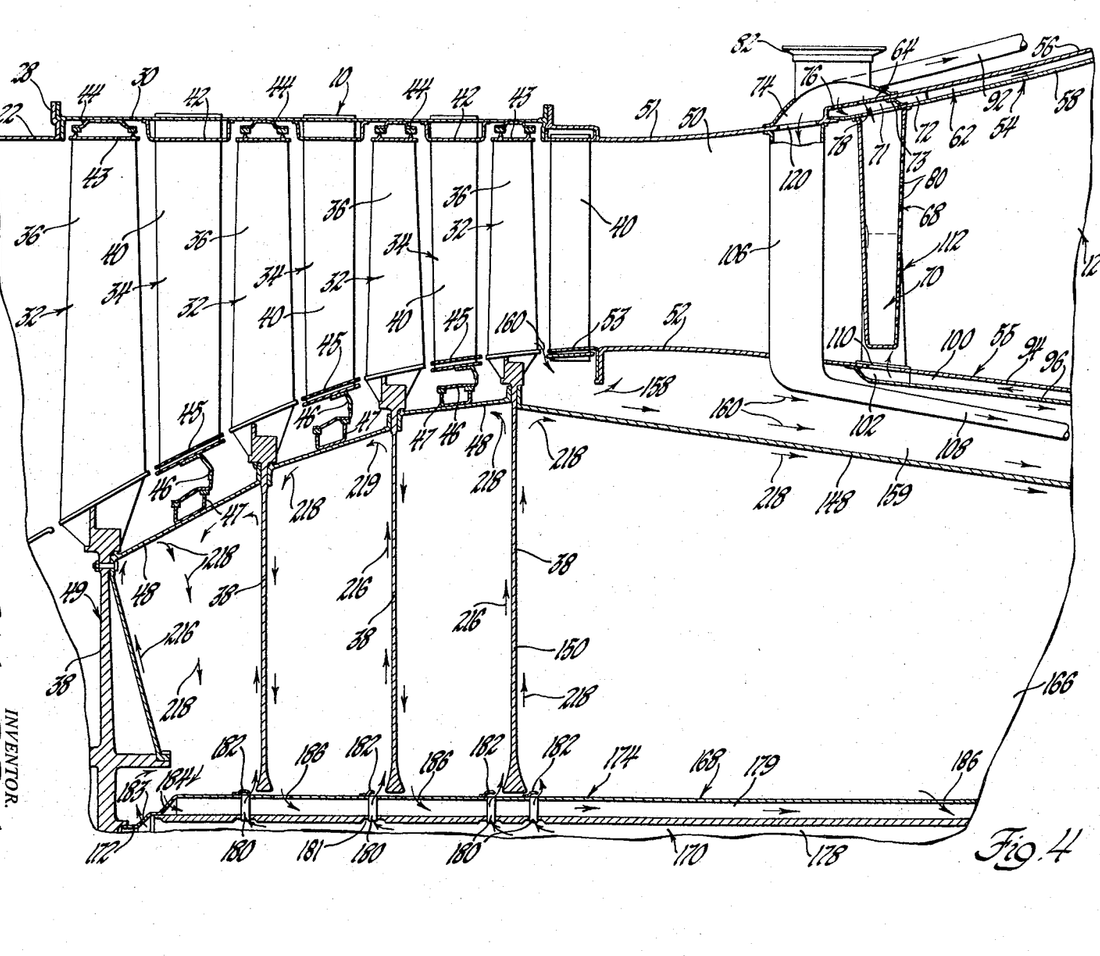
Figure 7:
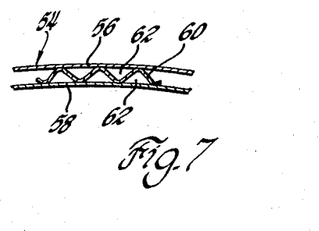
Figure 8:
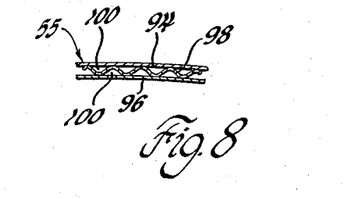

As seen best in FIGURE 4, both the outer and inner diffuser section walls 51 and 52 are extended further downstream to become a part of the outer and inner walls 54 and 55, respectively, of the combustion chamber 12. Both walls are of a sandwich-type construction (FIGS. 7 and 8), each consisting of two parallel annular walls radially separated from each other by an annular circumferentially corrugated sheet metal strip.

The construction of the outer chamber wall 54 consists of the two parallel walls 56 and 58 which extend for the length of the chamber and are joined to each other at opposite ends. The corrugated strip 60 forms hollow separated cooling passages 62 between each of the walls to which it is connected and opposite sides of the strip. It extends for almost the entire length of the combustion chamber but is terminated short at both ends to form annular manifolds 64 and 66, respectively, between the ends of the strip, and the joined wall edges.

As will be described in more detail later, fuel is fed into manifold 66, passes through the cooling passage 62 and is again collected by the manifold 64 to be fed into the combustion chamber through a number of spray bars 68. The fuel thus cools the walls 56 and 58 which it contacts, and the manifold 64 acts as both a collector and distributor. Manifold 64 also serves another purpose, and that is to act as a conveying manifold for the main flow of fuel directly from a main fuel supply line (not shown) into the main combustion chamber fuel spray bars 70.

Figure 12:
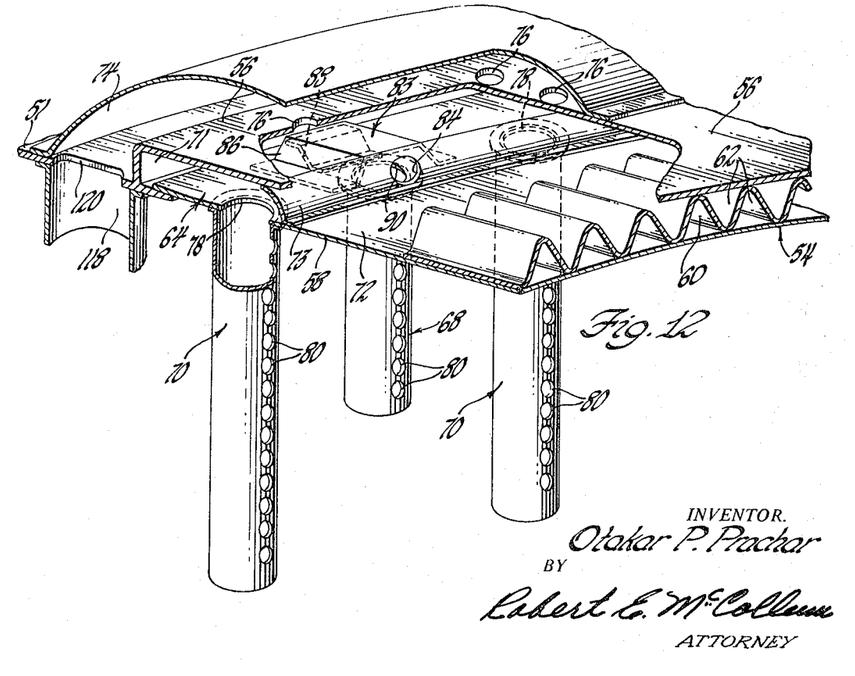
FIGURE 12 is a perspective view of the details of FIGURE 9.

To perform both of the above functions and yet maintain both of the fuel flows separated, the manifold 64 is divided into two parts 71 and 72 by a partition or wall 73 extending completely around the engine, as best seen in FIGURE 12. Manifold 71 is fed fuel directly from another annular fuel manifold 74 through a number of holes 76 in the outer casing wall 56, and feeds the fuel directly therefrom through holes 78 in the outer liner wall 58 into the open end of the circumferentially spaced main fuel spray bars 70. Spray bars 70 are each secured to wall 58 directly beneath the openings, and may be tubular as shown with a number of fuel orifices 80 in the casing equally spaced along the length of the bar. Since they are the main spray bars, they extend substantially across the entire width of the combustion chamber to evenly distribute the fuel spray into the chamber. Fuel manifold 74 is connected at one edge to wall 56 and at the other edge to the diffuser casing 51. It is fed fuel from the main fuel supply line (not shown) by a connecting line 82.

Figure 5:
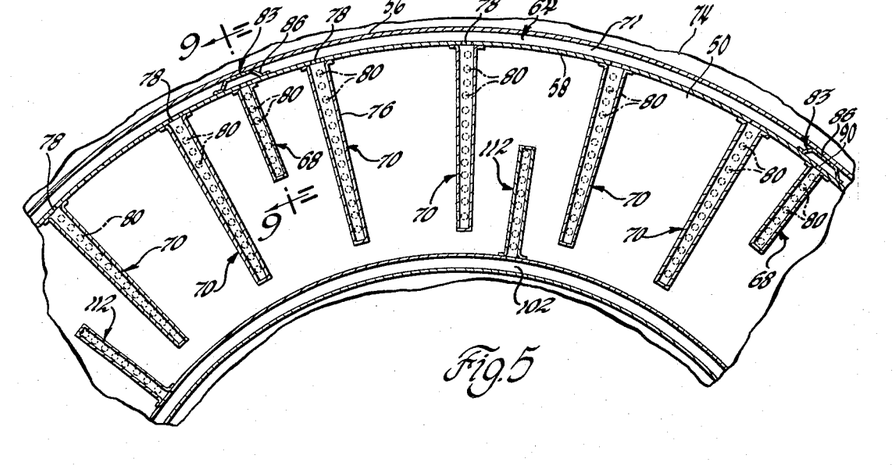
FIGURE 5 is an enlarged cross-section view of a portion of the FIGURE 1 construction taken on a plane indicated by and viewed in the direction of the arrows 5—5 of FIGURE 1.
Figure 9:
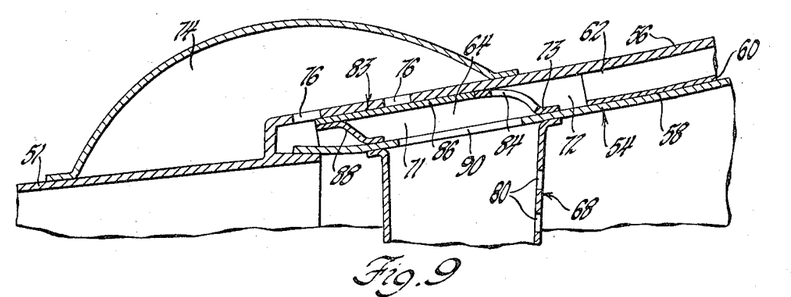
FIGURE 9 is an enlarged cross-sectional view taken on a plane indicated by and viewed in the direction of the arrows 9—9 of FIGURE 5.
Figure 10:
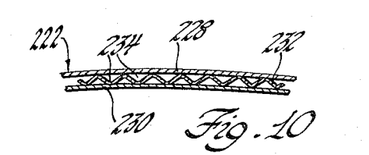
FIGURES 10 and 11 are enlarged cross-sectional views taken on planes indicated by and viewed in the direction of the arrows 10—10 and 11—11 of FIGURE 1.
Figure 11:
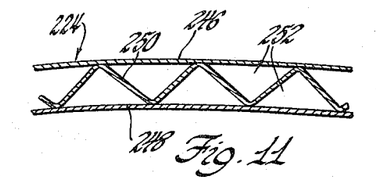

The other part 72 of the manifold 64 formed by the partition 73 cooperates with its own fuel spray bars 68 for delivering the cooling fuel from passages 62 into the combustion chamber. Spray bars 68 are circumferentially spaced from each other and the main spray bars 70, but are in the same radial plane to better mix the fuels. Spray bars 68 are also directly beneath manifold 71. Therefore, in order for the fuel to pass from the manifold 72 into spray bars 68, it must pass through a portion of manifold 71. To accomplish this without mixing the fuel flows, a number of somewhat tunnel-like constructions 83 are provided in manifold 71, whereby in each instance, the fuel in manifold 72 passes through a hole 84 in the wall 73 and into a trough-shaped conduit or header 86. The header 86 directs the fuel into spray bar 68 while at the same time isolating the fuel from the fuel in manifold 71. Header 86 is closed at one end 88 as seen in FIGS. 9 and 12, and is joined at its opposite open end to the partition 73. The walls of the header are secured to wall 58 thereby completing the three-sided hollow conduit. Holes 90 are provided in wall 58 directly beneath each header, and the fuel is fed through the holes into the open end of the fuel spray bar 68 secured to the wall. Spray bars 68 being secondary spray bars extend only partially into the combustion chamber. As best seen in FIG. 5, the spray bars 68 are of a construction similar to that of the main spray bars 70 and, as stated before, are spaced between. The number of headers 86, the spacing thereof, and the number of holes in wall 73 correspond, of course, to the number of spray bars 68. Thus, the cooling fuel in passages 62 passes into spray bars 68 through the partition 73 and headers 86 without mixing with the fuel in manifold 71.

A brief fuel flow description will sum up this phase of the operation of the engine. The entire fuel to be used in the engine initially flows from a source (not shown) of very low temperature (−400° F., for example) cryogenic liquid fuel under pressure having a high specific heat capacity. The fuel may or may not be fed into a heat exchanger (not shown), which if it is changes the liquid fuel to its vapor form before passing it through the engine through the main supply line. If it is not passed through a heat exchanger, the liquid fuel will vaporize almost immediately upon absorption of heat from the system since the volatilization point is very low. The branch line 82 therefore feeds the main supply of main combustion chamber fuel into manifold 74 and into spray bars 70 through manifold 71. Simultaneously fuel is fed from line 82 into a smaller flexible branch line 92 connecting at its downstream end with the manifold 66 (FIG. 3) and the inlet to passages 62. The fuel then passes through the cooling passages 62, into manifold 72, through holes 84 in wall 73 and into spray bars 68 through headers 86. The outer combustion liner wall 58, and casing wall 56 if it becomes hot for some reason, thus gives up the heat absorbed by it during the combustion process to the extremely cold fuel vapor, and the liner is maintained cool.

The cooling of the inner combustion chamber wall 55 is accomplished in a manner similar to that of cooling the outer wall 54, just described. As stated previously, the inner wall is also of a sandwich-type construction consisting of the two parallel walls 94 and 96 radially separated by a circumferentially corrugated annular sheet metal strip 98 to form cooling passages 100 between the strip and walls. The walls extend for the length of the chamber and are joined to each other at their upstream ends. The corrugated strip 98 extends for substantially the entire length of the chamber but is terminated short of the ends to provide annular fuel manifolds 102 and 104 at opposite ends of the chamber.

In brief, cooling fuel is fed through a conduit 106 and a connecting conduit 108 to the manifold 104 and the downstream inlet ends of the passages 100. The fuel then passes upstream cooling the inner linear combustion liner wall and is collected by the manifold 102. Manifold 102 directs the fuel through a number of holes 110 in liner 94 into the open ends of a number of tertiary fuel spray bars 112 to be distributed into the combustion chamber. Spray bars 112 are circumferentially spaced from each other and staggered with respect to the other spray bars as best seen in FIG. 5, and are mounted in the same radial plane as the others. Each of the spray bars may be of a construction similar to spray bars 70, i.e., a tubular closed end piece with spaced orifices and having its open end secured to liner wall 94 over the hole 110. Each of the spray bars 112 extends approximately to the chamber centerline.

Figure 3:
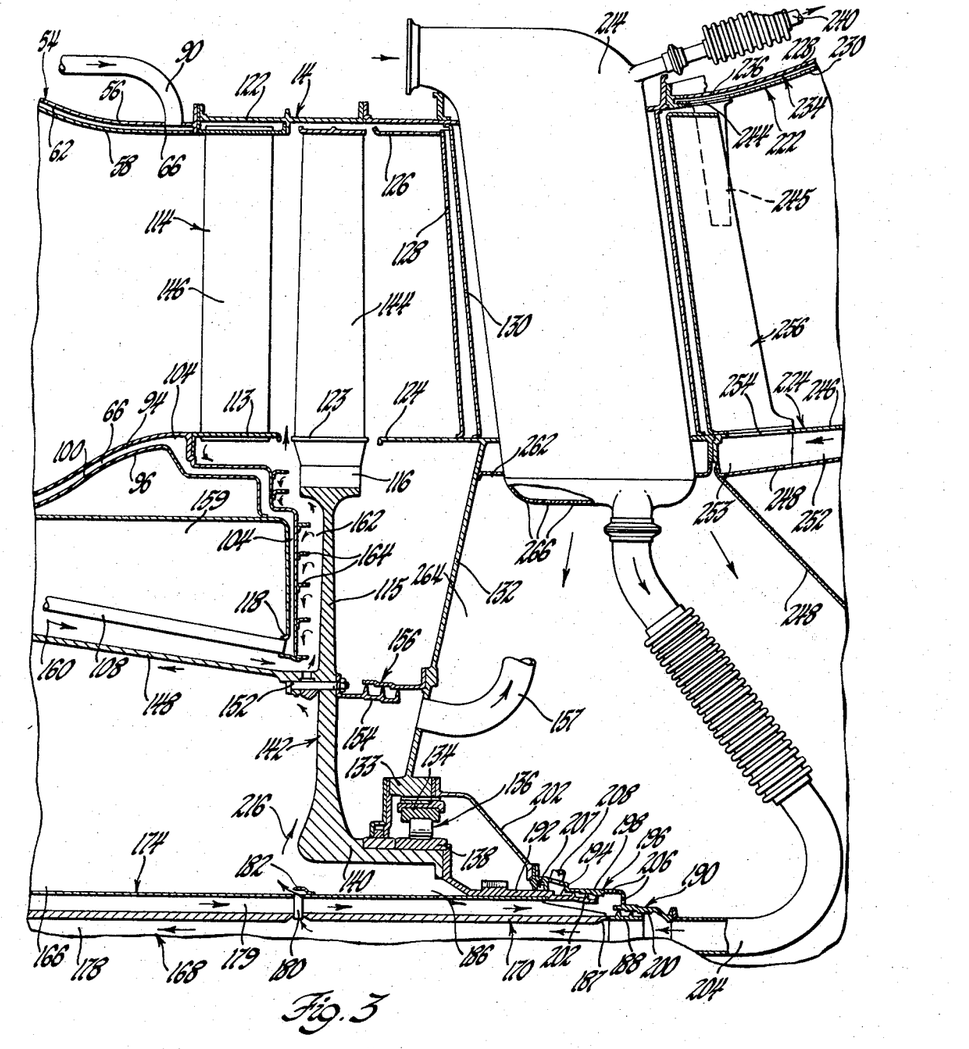

At the downstream ends of the combustion chamber, the walls 94 and 96 are both bent radially inwardly in several different directions as seen in FIG. 3. The walls pass around the inner shroud 113 of the turbine inlet nozzle 114 and substantially parallel the curvature of the turbine rotor wheel 115 and wheel-to-blade connection 116 to aid in cooling the face of the turbine rotor in a manner to be described later. The radially innermost inlet end 118 of the manifold 104 opens into and is fed fuel from the fuel supply conduits 106 and 108 previously mentioned. Fuel line 106 extends through and spans the diffusion passage 50 and is connected directly to the fuel manifold 74 through an opening 120 to receive the fuel from the supply line 82.

As thus far described therefore, the cryogenic fuel flows in three paths; first, the main fuel supply in manifold 74 flows directly into the primary fuel spray bars 70 through holes 76 in wall 56, manifold 71 and holes 78 in wall 58; secondly, from the manifold 74 through flexible pipe 92 into manifold 66, into and through the passages 62 cooling the liner 58, into manifold 72 and out through headers 86 into spray bars 68; and thirdly, through supply lines 106 and 108 to manifold 104 and the passages 100 to cool the combustion chamber inner liner 94, and then into the spray bars 112.

As best seen in FIG. 3, the turbine section 14 has an outer wall consisting of an annular casing portion 122 suitably connected at its opposite edges to the combustion and afterburner section casings. The inner wall is radially and axially defined by the inner shroud 113 of the turbine inlet guide vanes, the rotor blade platforms 123, and an inner shroud 124. Shroud 124 is connected to an outer annular shroud 126 by a number of circumferentially spaced streamlined fairings 128. Each of the fairings 128 encloses and is secured to one of a number of (only one shown) circumferentially separated turbine bearing support struts 130 secured to the outer casing 122. Shroud 124 has an annular partition 132 depending therefrom having an enlarged annulus 133 on its inner edge fixed to the outer race 134 of an annnular bearing 136. The inner race 138 of the bearing rotatably supports and is secured to the extended hub 140 of the wheel 115 of a single stage axial flow type turbine rotor 142. A number of circumferentially spaced rotor blades 144 are secured to the rotor wheel 115 by any suitable means and cooperate with a number of circumferentially spaced stator inlet guide vanes 146. Vanes 146 are secured to the casing 122 at one end as shown and at the other end are secured to and support the downstream end of the combustion liner wall 94 and inlet end of fuel passages 100.

As stated previously, the different compressor rotor stages are driven by the turbine through a suitable connection, this being the annular connecting drive drums 48 between compressor rotor wheels 38 (FIG. 4) and an annular drum 148. Drum 148 is secured at one edge to the last stage compressor wheel 150 and extends to and is secured to the turbine rotor wheel 115 at its other edge by circumferentially spaced bolts 152. The bolts also support and secure the rotatable portion 154 of a labyrinth seal 156 to rotor wheel 115. A conduit 157 maintains the space between the bearing 136 and the seal vented of any gas leaking through the seal, the vent leading to an opening (not shown) to vent the gas overboard of the engine.

The face of the turbine rotor wheel 115, and blade attachment portion 116 are cooled by the flow of fuel through manifold 104. This is accomplished by funneling or directing higher pressure and cooler compressor discharge air to the turbine rotor from the space 158 between the last stage rotor blades 36 and stator vanes 40. The directing means is defined by an annular gas chamber 159 between the inner diffuser and main combustion chamber walls 52 and 55 and the drive drum 148. The air flows in the direction indicated by the arrows 160 and passes over the fuel supply conduit 108 and into the space 162 between the rotor wheel 115, connection 116 and the extension of the inner liner wall 94 and manifold 104. The cooling fuel in manifold 104 therefore absorbs the heat from wall 94 which in turn has absorbed the heat from the air rushing past the face of the hot turbine rotor. A number of swirl producing baffles or fins 164 are attached to the liner 94 to help circulate the air and therefore constantly cool the air more effectively by the continuous contact with the cooled walls of the fuel manifold 104.

The stiffener drums 48 and 148 not only constitute turbine driven transmitting members to drive the compressor, but also double as the outer wall of an annular cooling annulus or chamber 166 to cool the interior parts of the compressor. The inner wall of the annulus or chamber is defined by a tubular dual fuel tube or conduit 168 mounted on the compressor axis. Conduit 168 sealingly engages and is secured to the first stage compressor rotor wheel 49 at its upstream end as shown to close one end of the chamber, and has a sealing engagement at its other end with the turbine rotor wheel hub 140 in a manner to be described.

In general, the conduit comprises concentrically and telescopically mounted interconnected tubes, one to carry the cooling fuel in to be discharged into chamber 166, and one to carry it out. The tubes rotate at turbine rotor speeds and the inlet tube is provided with openings to permit the fuel to be discharged into the chamber under the great centrifugal force imposed on the fuel. Once it enters the chamber, the fuel is immediately warmed by contact with the warm faces of the compressor rotor and turbine rotor wheels, causing convection currents to be set up thereby distributing the cool fuel to all parts of the chamber. Since the cool fuel displaces the hotter lighter fuel, the high centrifugal force of the fuel drives the warmed air to a toroidal-like fashion to all corners of the chamber and out through outlets in the outgoing tube. The hotter fuel is then discharged into a large cooling conduit to be described.

Figure 6:
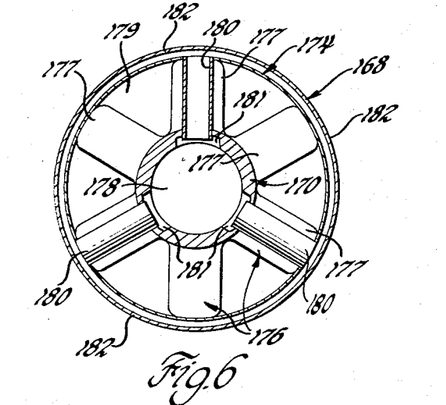
FIGURE 6 is an enlarged cross-sectional view taken on a plane indicated by and viewed in the direction of arrows 6—6 of FIGURE 1, FIGURES 7 and 8 are enlarged cross-sectional views of portions of details of FIGURE 1 taken on planes indicated by and viewed in the directions of the arrows 7—7 and 8—8, respectively, of FIGURE 1.

More specifically, the conduit 168 comprises a central tube 170 extending longitudinally through the rotor wheel hubs from its connection at 172 to the first stage rotor wheel 49 to a position adjacent the turbine rotor bearing 136. A sleeve tube 174 telescopically surrounds the tube 170 for its entire length and is radially separated from and secured to the tube by five axially separated sets of stiffeners 176 (FIG. 6). Each stiffener set comprises six hollow reinforcing members 177 spaced from each other and secured at opposite ends to and extending radially between the tubes 170 and 174. The hollow passage 178 defined by tube 170 constitutes a fuel inlet line, and the space 179 defined by the annulus between tubes 170 and 174 constitutes a fuel outlet line.

To discharge the cooling fuel from passage 178 into chamber 166, a number of open end hollow plugs or spigots 180 extend radially between the tubes 170 and 174 within the reinforcing members 177. The spigots are each secured at one end to tube 170 in relieved openings 181, and at the other end to the wall of sleeve 174 in an opening therein. Each of the spigots is located adjacent the faces of the rotor wheels, and the outer ends are partially covered by an annular fuel directing baffle or splatter shield 182 secured to tube 174. The splatter shields prevent the discharged cooling fuel from striking the rotor wheel hubs directly to prevent cracking of the hubs.

Sleeve tube 174 at its upstream end is joined to tube 170 closing the end of the passage 179. The connection of tube 170 to the compressor rotor wheel 49 also closes this end of tube 170. Therefore, a number of holes 183 and 184 are provided in this end of the tubes 170 and 174, respectively, to permit the cool fuel to be discharged into the chamber at this end on the one hand, and to permit the exit of the hotter fuel from the chamber on the other hand. The wall of tube 174 also has a number of fuel exit openings 186 along its length to permit the entry into the space 179 of the hotter fuel forced from chamber 166 as a result of the convection currents set up by the centrifuged cooler fuel in the chamber as previously described.

Tube 170 at its downstream end is relieved as shown at 187 and formed to provide one portion 188 of a labyrinth seal 190. Tube 174 at this end is fixedly inserted into a hollow flanged accessory drive shaft 192, which is secured to the turbine rotor wheel hub 140 at one edge and has the rotating portion 194 of another labyrinth seal 196 formed on its other edge. Both rotating portions of the seals cooperate with stationary seal portions 198 and 200 formed on a stationary annular support 202. The support is secured to partition 132 at one end, and at the other end to the end of an expandable fuel tube 204. The seals therefore maintain the conduit 168 divided into the separate fuel supply and return passages 178 and 179. The portion between the seals is apertured at 206 for discharging the warmed fuel from passage 179. The hollow space between seal 198 and a bearing seal 207 may be filled with an inert gas through conduit 208, the gas being at a pressure to maintain a constant leakage in a direction through seal 196 to prevent contamination of the bearing with the fuel in conduit 179.

Fuel passage 178 is connected at its inlet end to expandable tube 204 which in turn is connected at its opposite end to the bottom or one end of an enlarged fuel distributing pipe 214 secured within one of the hollow support struts 130. Pipe 214 is adapted to be connected at its other end through an opening in the engine casing 122 to the same source (not shown) of cryogenic fuel as that supplying the fuel for the main combustion chamber, i.e., a very low temperature fuel having a high specific heat capacity. The fuel in this pipe 214 serves as the fuel for afterburning as well as for cooling, as will be described, and the source of this afterburner fuel may be entirely separate from the main combustion chamber fuel source, if desired.

With the construction as thus far described, the chamber 166 is substantially sealed. The cooling of this portion of the engine is therefore as follows. Under normal running conditions of the engine, admission of the afterburner fuel into pipe 214 causes fuel to flow into line 204 and into the inlet of passage 178 to flow axially upstream under pressure. Since the tube is rotating at turbine rotor speed, the fuel will be centrifuged out into chamber 166 through the spigots 180 with great force, the fuel being deflected by the deflectors 182 to prevent a stream of the extremely cold fuel from directly hitting the rotor hubs. The centrifuged fuel flows radially outwardly as indicated by arrows 216 along the faces of each of the compressor and turbine rotor wheels 36 absorbing the heat thereof. As indicated by the arrows 218, the fuel then flows and is circulated to all parts of the chamber by means of convection currents set up by the displacement of the warmed fuel by the cooler centrifuged fuel. The warmed fuel is then forced out of the chamber by the cooler fuel and into the return annulus 179 through the outlets 186 in tube 174. The fuel then flows through line 179 and is finally discharged out through openings 206. Thus, the faces of the rotor wheels and the drums 48 and 148 and other parts of the chamber are cooled by the fuel absorbing the heat from the parts.

Returning now to the construction of the remaining sections of the engine, the afterburner combustion chamber extends rearwardly from the turbine section 14 and is defined by an outer annular engine casing 222 and an inner annular wall 224 formed as a part of the periphery of the inner exhaust cone 226. Both the outer casing and inner wall are of a sandwich type construction similar to that of the main combustion section to provide cooling passages through which cooling fuel is forced to cool the afterburner combustion liner and the inner exhaust cone. The outer casing 222 consists of two parallel walls 228 and 230 radially separated from each other by a circumferentially corrugated annular sheet metal strip 232 to form cooling passages 234 between the strips and walls. The walls extend for the length of the section and are joined to each other at opposite ends. The corrugated strip 232 extends for almost the entire length of the section but is terminated short of the ends to provide annular manifolds 236 and 238 between the ends and the strip.

Cooling fuel is fed from pipe 214 through the expandable branch line 240 into an annular manifold 242 surrounding manifold 238 and secured to wall 228. The fuel then flows into manifold 238 through a number of communicating holes 243 in wall 228, and flows upstream through passages 234 into manifold 236, cooling the liner wall 230. Manifold 236 then directs the fuel through holes 244 in wall 230 into the open ends of a number of secondary afterburner spray bars 245 secured to wall 230 and located at the inlet to the afterburner combustion chamber. The spray bars are of a construction similar to spray bars 70, are circumferentially spaced from each other, and extend approximately to the center line of the afterburner section.

As stated previously, the inner afterburner chamber wall 224 is formed as an integral part of the outer periphery of the exhaust nozzle inner cone as seen in FIG. 1. Except for the particular converging and diverging shape, the outer confines of the wall are, however, of a sandwich type construction similar to that of the outer wall 222. The inner wall is constructed in such a manner that the main supply of the afterburner combustion chamber fuel flows from pipe 214 downstream through a passage in the center of the exhaust cone to a point close to the apex of the cone, where the passage then is turned approximately 180° to flow upstream along the periphery of the cone and afterburner inner combustion liner to cool the same. The fuel is then discharged into the afterburner combustion chamber proper through primary fuel spray bars.

More specifically, inner wall 224 consists of two parallel walls 246 and 248 radially separated by an annular corrugated strip 250 secured to both to provide hollow cooling passages 252 between the strip and walls. The walls are joined to each other and to the turbine section inner shroud 124 at the discharge end of the fuel passages, and the corrugated strip is terminated short of this end connection to provide a manifold 253 therebetween. The manifold directs fuel from the passages through a number of holes 254 in wall 246 into the open ends of a number of primary afterburner spray bars 256 secured to the wall. The spray bars are of the same construction as spray bars 70, and extend substantially across the entire width of the combustion chamber. They are in the same radial plane as secondary spray bars 244 but are staggered circumferentially therefrom and each other in the same manner as spray bars 68, 70 and 112 to provide the most efficient and even distribution of fuel into the combustion chamber.

Both walls 246 and 248 and the corrugated strip 250 extend downstream to a point on the cone as shown at 257, the corrugated strip terminating at this point. The outer wall 246 extends further downstream to form the apex of the cone. Wall 248 at this point turns inwardly together with an annular guide member 258 form a radial cooling manifold or passage 259. Wall 248 is again then turned 90° as shown while guide member 258 diverges to form between the two a large fuel passage 260 extending upstream as shown. The fuel inlet end of passage 260 is again enlarged by flaring the end portion of wall 248 and securing it to the connection between the turbine inner shroud 124 and the end connection of walls 246 and 248. The inlet end of passage 260 thus defines together with an annular stiffener 262 secured to pipe 214, the annular partition 132, and the support 202 a fuel cooling chamber 264. The main supply of fuel for distribution through the primary afterburner fuel spray bars 256, while also is the cooling fuel, is fed into chamber 264 through a number of apertures 266 in the bottom or radially inner end of pipe 214. The fuel discharged from the annulus 179 of conduit 168 also is fed into this chamber. Thus, the cryogenic fuel flows along passage 260 and outwardly into passages 252 to flow upstream to cool the inner afterburner liner as well as the exhaust cone. The fuel then flows into manifold 253 and out into the combustion chamber through spray bars 256. It is to be noted that the outer exhaust nozzle portion includes an annular shroud 268 secured at its forward end as shown to the edge of the afterburner outer casing and manifold. This outer exhaust nozzle portion also may include relatively movable elements 270 (only partially shown) for varying the area of the nozzle. Other details are not given because they are known, form no part of the present invention, and are immaterial to an understanding of the invention.

It is also to be noted that the particular shapes and configurations of the main and afterburner combustion sections and exhaust nozzle and other sections are of a design according to known practices to produce the most efficient operation of the engine.

Having described the details of the invention, a brief description of the overall operation of the engine and the cooling system therefor is as follows.

Under normal running conditions of the engine, air taken in through the inlet 20 passes into and through the compressor from which it is discharged with a higher velocity, temperature, and pressure into the diffuser section wherein the velocity is reduced and kinetic energy converted to static pressure. From the diffuser section, the air is discharged into the main combustion chamber where it is mixed with cryogenic fuel fed into the chamber from the fuel spray bars 70, 68 and 112. Ignition of the mixture by any suitable means (not shown) causes the turbine 142 to be driven by the products of combustion, the motive fluid discharged through the turbine passing into the after-burner combustion chamber. There it is combined with the cryogenic fuel vapor sprayed into the chamber from the fuel spray bars 245 and 256 and ignited by suitable means (not shown) to produce the additional thrust desired, the exhaust nozzle further increasing the velocity, etc., of the gas.

Further details as to the general operation of the engine beyond those described are believed to be unnecessary since they are known and are immaterial to an understanding of the invention.

As to the operation of the cooling system, the main combustion chamber cryogenic fuel at −400° F., for example, is fed for burning purposes initially from the main supply line (not shown) into the main fuel spray bars 70 through the fuel inlet 82, manifold 74, and manifold 71. Simultaneously, the cryogenic fuel is fed for cooling purposes from manifold 74 into branch line 92, manifold 66 and into the inlet of cooling passages 62 to flow upstream along the length of the main combustion chamber outer liner. The liner is maintained cool by the fuel absorbing the heat therefrom, and the fuel is discharged from the secondary fuel spray bars 68 into the combustion chamber.

Main combustion chamber fuel is also fed from manifold 74 into conduits 106 and 108 to manifold 104 and the inlet end of passages 100 to cool the inner combustion liner 55, the fuel being subsequently discharged into the combustion chamber through spray bars 112. The cooling fuel in manifold 104 also maintains the compressor discharge air flowing past the turbine rotor face in chamber 162 cooled by contact of the air with the manifold.

Thus, the main combustion chamber fuel not only supplies the combustion chamber with a main source of fuel but also cools the inner and outer liners of the chamber as well as the face of the turbine rotor wheel.

A portion of the after-burner cryogenic fuel in pipe 214 passes into conduits 204 and passage 178 of tube 170 from which it is centrifuged out into chamber 166 to cool the rotor wheel faces and the internal compressor and turbine parts enclosed thereby. The fuel then is forced into return annulus 179 and out into chamber 264 to maintain the bearings, etc., cooled. The cooling of the drive drum 148 also aids in cooling the compressor discharge air passing along the outer side thereof.

The fuel discharged from the annulus 179 is combined with the main supply of afterburner fuel fed into chamber 264 from the apertures 266 in the bottom of pipe 214 to the inlet of fuel passages 252. The fuel then flows upstream cooling the inner exhaust cone casing and inner afterburner combustion liner and is subsequently discharged into the afterburner chamber through the main afterburner fuel spray bars 256. Simultaneously, the afterburner fuel is fed from pipe 214 into the branch line 240 and therefrom into the inlet end of the afterburner outer cooling passages 234 to flow along the same and cool the outer combustion liner 230. The fuel is then discharged into the afterburner chamber through spray bars 250.

The cryogenic fuel therefore is not only the main supply of fuel for burning in the main and afterburner combustion chambers, but also is a coolant to cool the inner and outer liners of the chambers, as well as the internal parts of the compressor and turbine rotor wheels and the inner exhaust nozzle. Thus, all hot sections of the engine are cooled by the passage of extremely cool fuel therethrough having a high specific heat capacity to absorb the heat therefrom.

From the foregoing, therefore, it will be seen that this invention provides an engine construction wherein the fuel serves a dual purpose of being both a fuel and a coolant for cooling the walls of the combustion chambers and other hot sections of the engine, thus permitting the design of higher Mach No. engines.

While the invention has been illustrated in its preferred embodiment in a gas turbine engine of the air breathing type, it will be obvious to those skilled in the art to which this invention pertains that many modifications may be made thereto without departing from the scope of the invention.

What is claimed is:

1. A fuel and cooling system for a turbomachine of the axial flow type having an outer annular longitudinally extending engine casing and inner longitudinally extending annular wall means cooperating therewith to together define axially aligned compressor, main combustion, turbine, and afterburner combustion sections therebetween for the flow of gas therethrough, a plurality of fuel injectors adapted to contain fuel secured to said casing and wall means and extending into each of the main and afterburner combustion sections for the injection of fuel therein, separate sources of cryogenic fuel each having a high specific heat capacity for said main and afterburner sections, means connecting said sources and said main and afterburner combustion section fuel injectors, portions of said engine casing and said wall means having hollow interiors adapted to contain fuel under pressure, and means connecting said sources of fuel and the hollow interiors of said casing and wall means for the flow of cryogenic fuel under pressure therethrough to cool the enclosure defining surfaces of said main and afterburner combustion sections, annular means enclosing the interior of said compressor section, and means connecting said afterburner section source of fuel to said last mentioned means for the flow of cryogenic fuel therethrough to cool said interior of said compressor section by the absorption of heat by said fuel.

2. A fuel and cooling system as in claim 1 wherein said compressor section has a compressor therein having a rotatable shaft secured thereto, and said means connecting said afterburner source of fuel and said compressor interior comprises fuel distributing means including the rotating shaft of said compressor.

3. A fuel and cooling system as in claim 2 wherein said shaft is hollow for containing said fuel and has a plurality of fuel exits therein in communication with the interior of said compressor, said fuel being connected to said hollow shaft at one end thereof, the rotation of said shaft centrifuging said fuel out through said exits into the interior of said compressor and against said annular means to cool the same by the absorption of heat by said cryogenic fuel, and means to connect said fuel from the interior of said compressor to said hollow interiors of said afterburner combustion section inner wall means for conveyance to said afterburner fuel injectors.

4. A fuel and cooling system as in claim 1 wherein conduit means are provided connecting a portion of the gas discharged from said compressor to said turbine section to cool a portion of a turbine contained therein, said conduit means and said inner main combustion section wall means containing cryogenic fuel and extending into adjacency with each other for absorbing heat from said turbine cooling gas by the said cryogenic fuel to further cool said turbine portion cooling gas.

5. A combustion chamber cooling and fuel system comprising annular hollow fuel carrying outer and inner walls extending longitudinally and being spaced radially from each other to provide a combustion chamber therebetween, a plurality of hollow fuel injectors spaced around and projecting into said chamber, a source of cryogenic fuel of high specific heat capacity under pressure, and means to connect the fuel from said source to said injectors and to the interior of said combustion chamber walls to cool said walls by the absorption of their heat by said fuel, said means comprising a first annular fuel manifold connected to said source of fuel and surrounding one end of said outer wall, means connecting a portion of said manifold and the interior of said inner wall at one end, means connecting the other end of said inner wall and some of said fuel injectors for the flow of fuel from said manifold through said inner wall to said injectors to cool said inner wall, the end of said outer wall within said fuel manifold being closed by means therein defining a closed second annular fuel manifold, said second manifold having apertures therein some of which connect the fuel from said first manifold directly into and through the second manifold and into the open ends of others of said fuel injectors secured to said second manifold, and fuel conducting means in said second manifold communicating at one end through others of said apertures in said second manifold with the fuel in the hollow outer wall and at their other ends through still others of said apertures with the open ends of further ones of said fuel injectors secured to said second manifold, and means connecting the fuel in said first manifold to the opposite end of said outer wall for flow therethrough and into said further ones of said injectors, the fuel flow through said walls cooling the walls and vaporizing the fuel.

6. A fuel cooling and supply system for a turbomachine having a compressor, a main combustion section, a turbine, an afterburner section, and an exhaust nozzle, said compressor having hollow means therein enclosing the interior of said compressor forming a chamber therein and being drivenly connected to said turbine, and fuel conducting means in said chamber connected to said turbine, said conducting means comprising a plurality of nested cylindrical hollow members each having a plurality of openings therein and being radially separated to form separated conduits, a source of cryogenic afterburner fuel under pressure having a high specific heat capacity, means connecting said source to the end of the inner of said conduits, means projecting from the openings in said inner member through the remaining of said plurality of members to open into said chamber for centrifuging the cryogenic fuel into said chamber against said hollow means upon rotation of said members to cool the hollow means by the absorption of its heat by said fuel, said cryogenic fuel flowing out of said chamber through the openings in the remaining of said plurality of members, a plurality of afterburner fuel injectors, said exhaust nozzle being of the plug type, said plug having hollow wall means defining the periphery thereof connected at one end to said fuel injectors, and means connecting the fuel flowing out said fuel conducting means to the opposite end of said plug wall means to cool the plug wall means by the flow of fuel therethrough to the fuel injectors.

References Cited

UNITED STATES PATENTS

| | | | |
|---|---|---|---|
| 2,586,025 | 2/1952 | Godfrey | 60—35.6 |
| 2,745,249 | 5/1956 | Sanborn | 60—35.6 |
| 2,780,915 | 2/1957 | Karen | 60—35.6 |
| 2,956,402 | 10/1960 | Rae | 60—35.6 |
| 3,000,176 | 9/1961 | Kuhrt | 60—35.6 |
| 3,024,606 | 3/1962 | Adams et al. | 60—35.6 X |

FOREIGN PATENTS

| | | |
|---|---|---|
| 915,088 | 7/1954 | Germany. |
| 811,745 | 4/1959 | Great Britain. |

CARLTON R. CROYLE, *Primary Examiner.*

SAMUEL FEINBERG, *Examiner.*

D. HART, *Assistant Examiner.*

UNITED STATES PATENT OFFICE
CERTIFICATE OF CORRECTION

Patent No. 3,377,803                      April 16, 1968

Otakar P. Prachar

It is certified that error appears in the above identified patent and that said Letters Patent are hereby corrected as shown below:

Column 6, line 5, "to", first occurrence, should read -- in --. Column 7, line 53, "the" should read -- an --. Column 8, line 32, "inwardly together" should read -- inwardly to together --; line 45, "while" should read -- which --.

Signed and sealed this 3rd day of March 1970.

SEAL)

Attest:

Edward M. Fletcher, Jr.

Attesting Officer

WILLIAM E. SCHUYLER, JR.

Commissioner of Patents